(12) United States Patent
Toki

(10) Patent No.: US 6,834,744 B2
(45) Date of Patent: Dec. 28, 2004

(54) SPEAKER SYSTEM

(75) Inventor: Nozomi Toki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/126,619

(22) Filed: Apr. 22, 2002

(65) Prior Publication Data

US 2002/0153193 A1 Oct. 24, 2002

(30) Foreign Application Priority Data

Apr. 23, 2001 (JP) .......................... 2001-123857

(51) Int. Cl.[7] ............................................. H05K 5/00
(52) U.S. Cl. ...................... 181/148; 181/171; 181/198; 181/199; 181/175; 381/74; 381/309; 381/337; 381/345; 381/386
(58) Field of Search ................. 381/111–117, 349–354, 381/127, 396, 322, 386, 431, 171, 347, 398, 423, 351, 345, 348, 162, 382, 174, 179, 177; 455/347, 350; 181/148–158, 175, 184–185, 198–202, 129

(56) References Cited

U.S. PATENT DOCUMENTS

| | | | | |
|---|---|---|---|---|
| 4,944,017 | A | * | 7/1990 | Cognasse et al. ............. 381/79 |
| 5,303,209 | A | * | 4/1994 | Frasl ........................... 367/174 |
| 5,524,151 | A | * | 6/1996 | Bleim .......................... 381/396 |
| 5,812,678 | A | * | 9/1998 | Scalise et al. ................ 381/67 |
| 5,821,471 | A |   | 10/1998 | McCuller |
| 6,075,866 | A | * | 6/2000 | Frasl et al. .................. 381/177 |
| 6,160,897 | A | * | 12/2000 | Klein .......................... 381/396 |
| 6,490,361 | B1 | * | 12/2002 | Klein .......................... 381/353 |
| 6,504,937 | B1 | * | 1/2003 | Papadopoulos et al. ..... 381/113 |

FOREIGN PATENT DOCUMENTS

| | | |
|---|---|---|
| EP | 0 565 369 | 10/1993 |
| EP | 0 909 077 | 4/1999 |
| GB | 2 184 323 | 6/1987 |
| JP | 7-162994 | 6/1995 |
| JP | 10-150698 | 6/1998 |
| JP | 11-008898 | 1/1999 |
| JP | 11-075294 | 3/1999 |
| JP | 2000-232505 | 8/2000 |
| WO | WO 00/21330 | 4/2000 |

* cited by examiner

*Primary Examiner*—Michael Sherry
*Assistant Examiner*—Renata McCloud
(74) *Attorney, Agent, or Firm*—Foley & Lardner LLP

(57) ABSTRACT

This invention has been made to provide a speaker system capable of miniaturization and presenting a good sound quality. A speaker 15 is mounted on a printed circuit board 21 arranged inside a telephone body enclosure 12. Acoustic waves of positive phase produced by vibration of a diaphragm 23 of the speaker 15 are output through front acoustic apertures 28 and a front air chamber 37 to the exterior from an enclosure acoustic aperture 13. On the other hand, the acoustic waves of opposite phase enter a rear air chamber 35 through rear acoustic apertures 29, reach an enclosure internal space 36 through an opposite-phase opening 34 provided by cutting away a part of a rear sealing member 32, and transmit to a card slot 14, then being output to the exterior. The opposite-phase opening 34 as an opening allows the acoustic waves to be output in a direction remotest from the card slot 14, so that the acoustic waves of opposite phase are output to the extension through the remotest path in the enclosure of the speaker resulting in reducing interference of the acoustic waves of positive phase and negative phase. This enables realization of a speaker system of small size but of a good sound quality.

6 Claims, 4 Drawing Sheets

SPEAKER SYSTEM

BACKGROUND OF THE INVENTION

1. Field of the Invention

The present invention relates generally to a speaker system, and more particularly to a speaker system capable of miniaturization, which is incorporated into hand-held, small-sized electronic equipment such as mobile telephones or PDAs (Personal Digital Assistants).

2. Description of the Related Art

Speaker systems are used in various apparatuses for the purpose of listening to music or diverse sound information. As used herein, the speaker system refers to a system including a speaker for directly outputting acoustic waves, and a peripheral device for regulating the output of the acoustic waves.

The speaker is arranged to generate acoustic waves from a sheet-like member such as cone paper or resin sheet, which oscillates in response to sound signals. When the sheet-like member oscillates, acoustic waves are output from its front surface and simultaneously acoustic waves of opposite phase thereto are output from its rear surface. When these acoustic waves reach a listener, wavelength components having a closer relation to opposite phases are more cancelled so that the sound pressure at that frequency will lower.

In order to solve such a problem, either of two techniques has hitherto been employed. One technique is to configure a speaker system by incorporating a speaker into a sealed enclosure such that only its front is open. This enables acoustic waves of opposite phase output from the rear of the speaker to be blocked. The other technique is to make up a speaker system by mounting the speaker itself on a flat board having a relatively large area. This imparts a sufficient distance to the acoustic wave path when the acoustic waves of opposite phase output from the rear of the speaker travel to the front, to thereby prevent any possible attenuation of acoustic waves of low frequency components.

In the former technique, it is necessary to render the enclosure making up the speaker system relatively large, resistant to oscillation and rigid. Accordingly, although the former technique may be suitable for the speaker system disposed in the room or the like, it may be problematic in terms of size and weight to incorporate the speaker system into the hand-held equipment.

The latter technique to mount the speaker on a relatively wide flat board also needs to incorporate such a wide flat board into the speaker system. Therefore, it is similarly difficult to incorporate the same into hand-held small-sized electronic equipment.

On the other hand, in the field of mobile telephones or PDAs for instance, receiving and reproducing music or melodies via a network such as Internet have become more and more active. In consequence, even a relatively small-sized speaker system tends to be subjected to an increasing demand for higher-quality sound reproduction.

SUMMARY OF THE INVENTION

It is therefore an object of the present invention to provide a speaker system capable of miniaturization and presenting a good sound quality.

Another object of the present invention is to provide a speaker system capable of miniaturization, taking the reproduction of low-frequency band into consideration.

According to an aspect of the present invention there is provided a speaker system comprising (i) an enclosure having an enclosure acoustic aperture formed at a predetermined position, for outputting acoustic waves to the exterior, and at least one opening through which acoustic waves are output, formed at another position different from the predetermined position of the enclosure acoustic aperture; (ii) a diaphragm disposed within the enclosure at a position confronting the enclosure acoustic aperture, for allowing acoustic waves of positive phase generated forwardly as a result of oscillations to be output through the enclosure acoustic aperture; a diaphragm holding member for peripherally holding the diaphragm in a freely oscillatory manner; (iii) a plate-like member arranged confronting and apart from a rear surface of the diaphragm; and (iv) a blocking member having at least one opposite-phase opening at a position relatively remote from the at least one opening, the opposite-phase opening acting as an opening for outputting therethrough acoustic waves of opposite phase generated by the diaphragm, the blocking member blocking the output of acoustic waves between the plate-like member and the diaphragm holding member, excepting the opposite-phase opening.

Thus, by providing the opposite-phase opening for delivering acoustic waves of opposite phase output from the rear surface of the speaker diaphragm, to a site within the enclosure relatively apart from the enclosure opening, the difference in path between the positive phase and the negative phase of acoustic waves is increased as much as possible so that the cancellations of the acoustic waves can be reduced. This enables even a relatively small enclosure to secure a good sound quality similar to a large enclosure.

An acoustic low-pass filter is preferably provided cooperatively by an air chamber defined by the plate-like member, the diaphragm holding member and the blocking member, and by the opposite-phase opening acting as exit for acoustic waves.

Thus, the air chamber defined by the plate-like member, the diaphragm holding member and the blocking member, and the opposite-phase opening acting as an exit for acoustic waves provide in cooperation an acoustic low-pass filter so that low tones can satisfactorily be reproduced.

Preferably, the enclosure is an enclosure for a mobile telephone, and the opening present in the enclosure is a card slot.

Thus, the enclosure can be one for a mobile telephone by way of example. The present invention is equally applicable to other small-sized enclosure for PDAs, etc., accommodating a speaker. Such small-sized apparatuses can typically have a card slot as an opening.

When the enclosure has a single opening, the opposite-phase opening may be arranged at a position remotest from the single opening of the enclosure.

Thus, if there is a substantially single opening in the enclosure, the opposite-phase opening would ideally be arranged at a position remotest from the enclosure opening in order to ensure maximal difference in path between the positive phase and the negative phase.

When the enclosure has a plurality of openings, the opposite-phase opening may be arranged at a position remotest from a major one of the plurality of openings, through which acoustic waves are output.

Thus, if there are a plurality of openings in the enclosure, it would be effective to arrange the opposite-phase opening at a position remotest from a major one of the plurality of openings, through which acoustic waves are output.

When the enclosure has a plurality of openings, the opposite-phase opening may be arranged at a position remote on average from a major one of the plurality of openings, through which acoustic waves are output.

Thus, if there are a plurality of openings in the enclosure, it would be effective to arrange the opposite-phase openings at a position remote on average from the plurality of openings.

BRIEF DESCRIPTION OF THE DRAWINGS

The above and other objects, aspects, features and advantages of the present invention will become more apparent from the following detailed description when taken in conjunction with the accompanying drawings, in which.

DETAILED DESCRIPTION OF THE PREFERRED EMBODIMENTS

The present invention will now be described with reference to the accompanying drawings which illustrate preferred embodiments thereof in a non-limitative manner.

Figure 1:
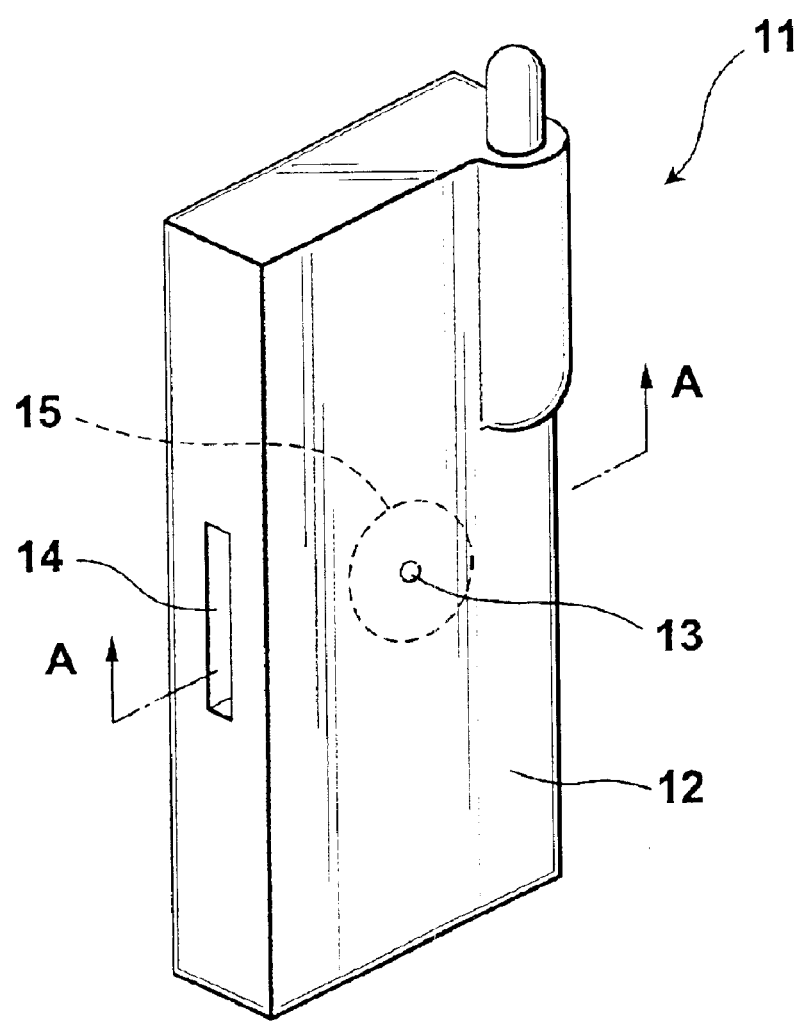
FIG. 1 is a perspective view, as viewed from rear side, of a mobile telephone using a speaker system in accordance with an embodiment of the present invention.

FIG. 1 shows a mobile telephone using a speaker system in accordance with an embodiment of the present invention, as viewed from the rear side. The mobile telephone is generally designated at 11 and comprises a telephone body enclosure 12 having at its rear side an enclosure acoustic aperture 13 in the form of a small hole for outputting acoustic waves to the exterior. The telephone body enclosure 12 has at its lateral side a card slot 14 for receiving any card such as a memory card. The telephone body enclosure 12 has at its front side not shown no other openings which lead to the exterior, than small holes intended for a speaker and a microphone for conversations over the telephone.

The telephone body enclosure 12 incorporates therein a speaker 15 located in the vicinity of the enclosure acoustic aperture 13. The speaker 15 is provided separately from the speaker for conversations disposed at the front side and serves as an ordinary speaker for outputting calling tones or downloaded music to the surroundings. It is therefore desirable that the speaker 15 should have not only a sound quality suitable for conversations but also as high sound quality as possible.

Most of acoustic waves from the speaker 15 are output through the enclosure acoustic aperture 13, while some of the acoustic waves transmit through the interior of the telephone body enclosure 12 and output to the exterior through the card slot 14. The speaker system of this embodiment is a combination of the speaker 15 and the telephone body enclosure 12 and aims to improve the sound quality by allowing low tone components in particular to be output through the card slot 14 to the exterior.

Figure 2:
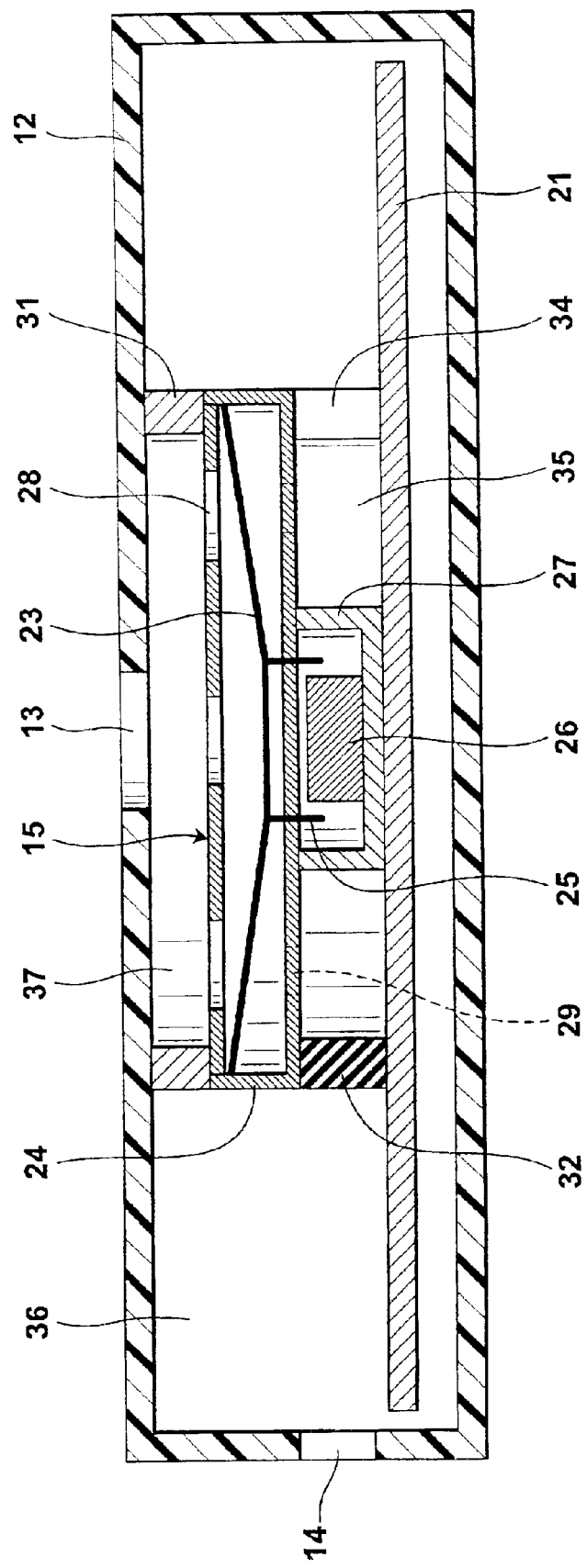
FIG. 2 is a sectional view of a telephone body enclosure taken along line A—A of FIG. 1.

FIG. 2 shows a section of the telephone body enclosure taken along line A—A of FIG. 1. A printed circuit board 21 having various circuit elements mounted thereon is fixed in position by fastening means not shown within the interior of the telephone body enclosure 12. The speaker 15 is fitted to the printed circuit board 21 at the position confronting the enclosure acoustic aperture 13. The speaker 15 is comprised of an upper enclosure (diaphragm holding member) 24 housing a diaphragm 23 therein, and a lower enclosure 27 housing a magnet 26 disposed therein for vertically oscillating a voice coil 25 attached to the bottom of the diaphragm 23, in response to acoustic signals.

The top surface of the upper enclosure 24 confronting the enclosure acoustic aperture 13 includes a plurality of front acoustic apertures 28 for outputting acoustic waves of positive phase generated toward the enclosure acoustic aperture 13 by oscillations of the diaphragm 23, to the exterior of the enclosure. The bottom surface of the upper enclosure 24 includes a plurality of rear acoustic apertures 29 for outputting acoustic waves of opposite phase generated by oscillations, to the exterior of the enclosure.

A front sealing member 31 is provided along the periphery of the upper enclosure 24 between the top surface of the upper enclosure 24 and the confronting inner surface of the telephone body enclosure 12. This is a sealing member serving to direct the acoustic waves of positive phase output from the front acoustic apertures 28, only toward the enclosure acoustic aperture 13. A rear sealing member (blocking member) 32 is provided between the rear surface of the upper enclosure 24 and the printed circuit board (plate-like member) 21, for similarly restricting the direction toward which the acoustic waves of opposite phase are output. Unlike the front sealing member 31, the rear sealing member 32 is partly cut away to form an opposite-phase opening 34. The opposite-phase opening 34 is positioned relatively away from the card slot 14. The acoustic waves of opposite phase output from the rear acoustic apertures 29 enter a rear air chamber 35 and are sent through the opposite-phase opening 34 to an enclosure internal space 36. The rear air chamber 35 of this embodiment acts as a low-pass filter for the opposite-phase opening 34. As a result, relatively low frequency components of audible acoustic waves can pass through the opposite-phase opening 34 at a lower attenuation rate than the other frequency components.

A variety of constituent elements not shown are disposed within the enclosure internal space 36 through which there exist spaces for allowing passage of the acoustic waves. Thus, the acoustic waves sent to the enclosure internal space 36 transmit through those spaces and are output from the card slot 14 positioned relatively apart from the opposite-phase opening 34 to the exterior of the telephone body enclosure 12.

Figure 3:
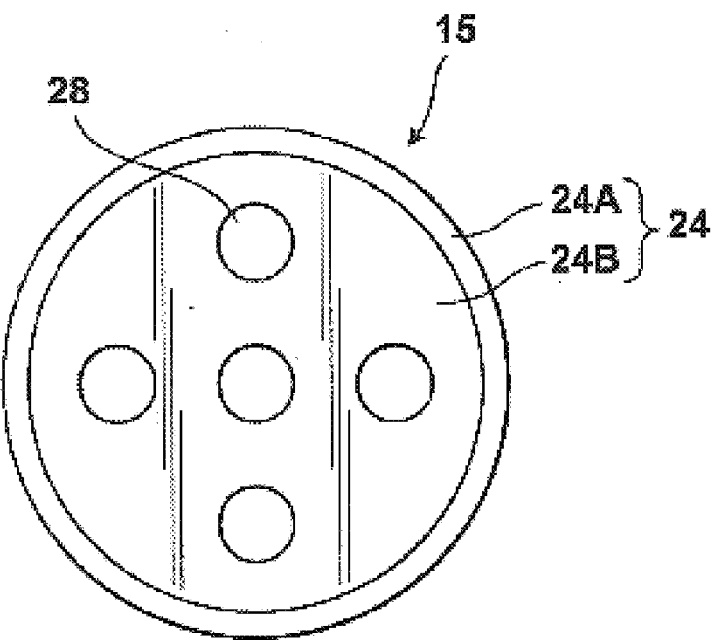
FIG. 3 is a front view of an upper enclosure of a speaker of the embodiment.

FIG. 3 is a front view of the upper enclosure 24 of the speaker 15. The upper enclosure 24 consists of an enclosure body part 24A accommodating the diaphragm 23 shown in FIG. 2, and a disk-shaped lid 24B having the plurality of front acoustic apertures 28 formed therein.

Figure 4:
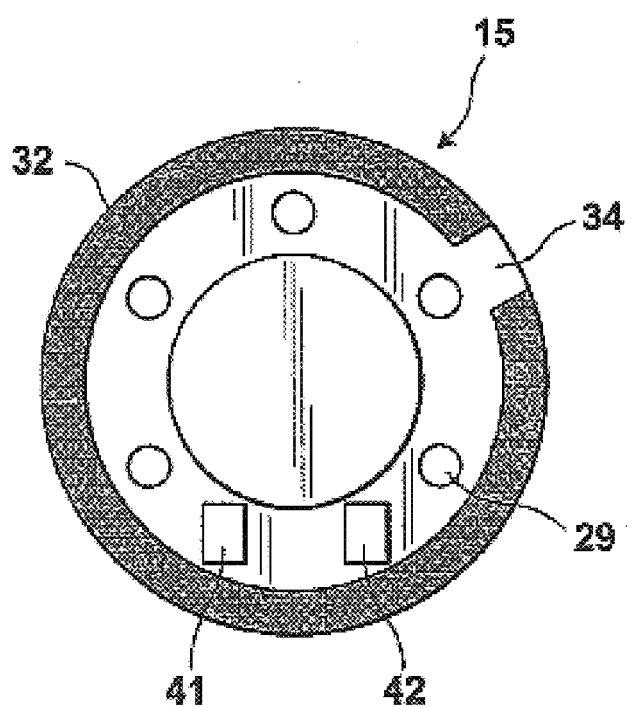
FIG. 4 is a back view of the upper enclosure of the speaker of the embodiment.

FIG. 4 is a back view of the upper enclosure 24 of the speaker 15. The rear surface of the upper enclosure 24 is fitted with the rear sealing member 32 extending along the periphery of the upper enclosure 24. The rear sealing member 32 is partly cut away to form the opposite-phase opening 34. The rear surface of the upper enclosure 24 has the plurality of rear acoustic apertures 29, and terminals 41 and 42 of the voice coil 25 of FIG. 2 attached thereto. Lead wires not shown are fitted at their one ends to the terminals 41 and 42, and at the other ends to acoustic signal output terminals not shown of the printed circuit board 21 shown in FIG. 2.

With the speaker system of this embodiment thus configured, acoustic signals are fed to the terminals 41 and 42 shown in FIG. 4 so that the voice coil 25 is caused to oscillate, which in turn oscillates the diaphragm 23. The acoustic waves of positive phase produced thereby are output from the front acoustic apertures 28 of the upper enclosure 24, and delivered from a front air chamber 37 defined by the front sealing member 31, the inner surface of the telephone body enclosure 12 and the top surface of the upper enclosure 24, through the enclosure acoustic aperture 13, to the exterior. On the other hand, the acoustic waves of opposite phase generated by oscillations of the diaphragm 23 are output from the rear air chamber 35 through the opposite-phase opening 34 and further through the card slot to the exterior so that they can reach ears of the listener by way of the most roundabout path within the telephone body enclosure 12.

This enables the difference in path between the positive phase and the opposite phase of acoustic waves to be maximized, similar to the speaker being fixed on its opposite phase side to a flat board having a relatively wide area. If there is little or substantially no difference in path between the positive phase and the opposite phase of acoustic waves, then associated components of the acoustic waves will be cancelled due to the phases being in opposition. This embodiment can reduce cancellation of low frequency components, in particular, of the acoustic waves, due to the significant difference in path between the positive phase and the opposite phase. Low frequency components are thus satisfactorily reproduced in conjunction with the acoustic low-pass filter. Regarding the high-frequency components, the amount of passage will be reduced by the presence of the low-pass filter, with the result that it is possible to reduce any possible interference between the positive phase and the opposite phase of the acoustic waves on the outside of the telephone body enclosure 12.

In this manner, the speaker system of this embodiment can prevent the interference as much as possible between the positive phase and the opposite phase of the acoustic waves, by the provision of the opposite-phase opening 34 at a position remotest from the card slot 14 or from the opening through which the sound is output, even though the speaker is incorporated in a small-sized apparatus like a mobile telephone. For this reason, the sound quality can sufficiently be enhanced even if the speaker is incorporated into a small enclosure.

Figure 5:
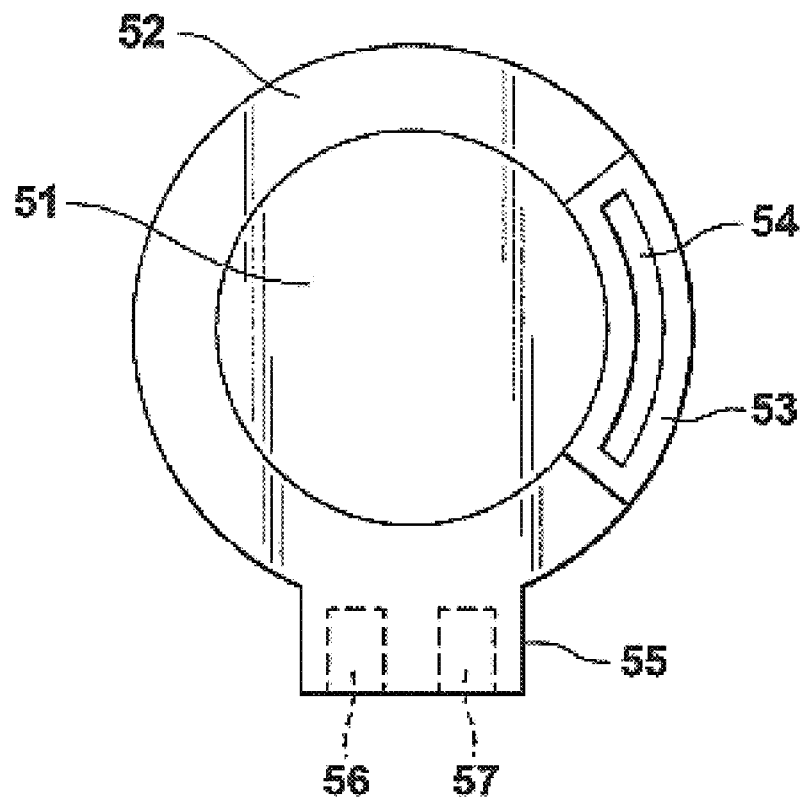
FIG. 5 is a front view of a speaker enclosure in accordance with a variant of the present invention.
Figure 6:
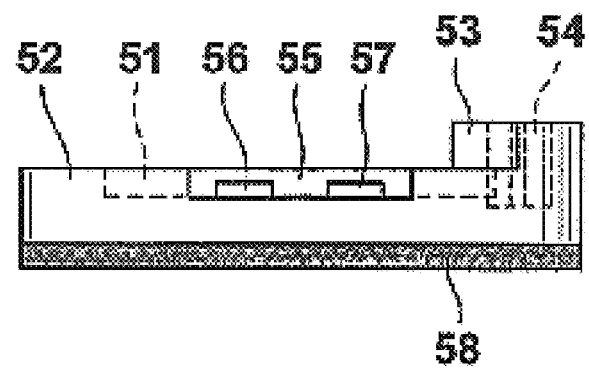
FIG. 6 is a side elavational view of the speaker enclosure in accordance with the variant of the present invention.

FIG. 5 is a front view of a speaker enclosure in accordance with a variant of the present invention, and FIG. 6 shows, in side elevation, the speaker enclosure depicted in FIG. 5. The speaker enclosure, generally designated at 51, of the variant does not employ such a separate structure as in the above embodiment where the upper enclosure 24 housing the diaphragm 23 therein is provided separately from the lower enclosure 27 housing the magnet 26 therein, but instead comprises an integrated tubular plastic mold 52. The plastic mold 52 projects at a part thereof to form a protrusion 53. The interior of the protrusion 53 is formed with an acoustic wave guidance aperture 54 through which are guided acoustic waves of positive phase generated from a diaphragm not shown. The acoustic wave guidance aperture 54 leads to the enclosure acoustic aperture 13 formed in the telephone body enclosure 12 (see FIG. 1).

As is clear from FIG. 5, the plastic mold 52 projects at another part thereof toward the direction away from the center axis of the speaker enclosure 51, to form a terminal accommodating portion 55. The terminal accommodating portion 55 is molded with terminals 56 and 57 connected to a voice coil not shown. A rear sealing member 58 is secured to the rear side of the speaker enclosure 51. Similar to the rear sealing member 32 of the above embodiment, the rear sealing member 58 is partly cut away (not shown), a part of which forms an opposite-phase opening in the same manner as the embodiment of FIG. 4.

The rear side of the speaker enclosure 51 of this variant is provided with a plurality of rear acoustic apertures (not shown), in the same manner as the above embodiment. The rear sealing member 58 defines a rear air chamber (not shown) in cooperation with a planar member such as a printed circuit board not shown. Accordingly, acoustic waves of opposite phase are output from the rear air chamber through the opposite-phase opening to the interior of the enclosure, and further therefrom through an opening not shown which opens into the exterior, to the outside of the enclosure. It is thus possible in this variant as well to weaken the interference between the positive phase and the opposite phase of the acoustic waves output from the diaphragm, by positioning the opposite-phase opening as remote as possible from the enclosure opening such as a slot.

Although the above description of the embodiment has been made of the example configuring the speaker system by use of a mobile telephone, the speaker system of the present invention could naturally be made up in the same manner by using other relatively small-sized enclosure such as a PDA. In the embodiment, the present invention has been applied to other speakers than for conversation use, but the present invention would similarly be applicable to the speakers for conversation use.

Although in the description of the embodiment the card slot 14 prepared for the insertion of the card has been used as the opening, the enclosure may include other openings such as earphone jack connectors. Therefore, a single or a plurality of openings could be provided for the output of the acoustic waves of opposite phase. When a plurality of openings are present, it is a matter at which position there lies the opposite-phase opening for guiding acoustic waves of opposite phase generated by the diaphragm of the speaker. In case of a single opening, as has already been discussed, the opposite-phase opening is most preferably provided at a position allowing the acoustic waves to be output toward the direction remotest from the opening. In case of a plurality of openings, the opposite-phase opening is provided at a position allowing the acoustic waves to be output toward the direction remotest from the major one of the plurality of openings. The opposite-phase may effectively be provided at a position allowing the acoustic waves to be output toward the direction positionally remotest on average from the plurality of openings.

As set forth hereinabove, according to the present invention, the opposite-phase opening is provided for delivering acoustic waves of opposite phase output from the rear surface of the speaker diaphragm, to a location within the interior of the enclosure, relatively apart from the openings of the enclosure so that the difference in path between the positive phase and the opposite phase of the acoustic waves can be maximized to reduce the cancellation of the acoustic waves, whereby even a relatively small enclosure can secure a good sound quality similar to a large enclosure.

According to the present invention, an acoustic low-pass filter is cooperatively provided by the air chamber defined by the plate-like member, the diaphragm holding member and the blocking member, and by the opposite-phase opening serving as an exit for acoustic waves, with the result that the low tones can satisfactorily be reproduced using the opposite-phase acoustic waves.

While illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. A speaker system comprising:

an enclosure having an enclosure acoustic aperture formed at a predetermined position, for outputting acoustic waves to the exterior, and at least one opening through which acoustic waves are output, formed at another position different from said predetermined position of said enclosure acoustic aperture;

a diaphragm disposed within said enclosure at a position confronting said enclosure acoustic aperture, for allowing acoustic waves of positive phase generated forwardly as a result of oscillations to be output through said enclosure acoustic aperture;

a diaphragm holding member for peripherally holding said diaphragm in a freely oscillatory manner;

a plate-like member arranged confronting and apart from a rear surface of said diaphragm;

a blocking member having at least one opposite-phase opening at a position remote from said at least one opening, said opposite-phase opening acting as an opening for outputting therethrough acoustic waves of opposite phase generated by said diaphragm, said blocking member blocking the output of acoustic waves between said plate-like member and said diaphragm holding member, excepting said at least one opposite-phase opening;

wherein said blocking member encloses a space defining a rear air chamber between said plate-like member and said diaphragm holding member, and has a side wall contacting said plate-like member and said diaphragm holding member, said opposite phase opening formed in said side wall;

said rear air chamber containing a magnet.

2. The speaker system according to claim 1, wherein an acoustic low-pass filter is provided cooperatively by an air chamber defined by said plate-like member, said diaphragm holding member and said blocking member, and by said opposite-phase opening acting as an exit for acoustic waves.

3. The speaker system according to claim 1, wherein said enclosure is an enclosure for a mobile telephone, and wherein said opening present in said enclosure is a card slot.

4. The speaker system according to claim 1, wherein when said enclosure has a single opening, said opposite-phase opening is arranged at a position remotest from said single opening of said enclosure.

5. The speaker system according to claim 1, wherein when said enclosure has a plurality of openings, said opposite-phase opening is arranged at a position remotest from a major one of said plurality of openings, through which acoustic waves are output.

6. The speaker system according to claim 1, wherein when said enclosure has a plurality of openings, said opposite-phase opening is arranged at a position remote on average from major one of said plurality of openings, through which acoustic waves are output.

* * * * *